United States Patent
Guntermann et al.

(10) Patent No.: US 11,186,177 B2
(45) Date of Patent: Nov. 30, 2021

(54) MOTOR HOUSING FOR AN ELECTRIC COMPRESSOR OF AN AIR CONDITIONING SYSTEM

(71) Applicant: Hanon Systems, Daejeon (KR)

(72) Inventors: Bernd Guntermann, Lennestadt (DE); Michael Friedl, Pulheim (DE); Stephan Werker, Merzenich (DE)

(73) Assignee: Hanon Systems, Daejeon (KR)

( * ) Notice: Subject to any disclaimer, the term of this patent is extended or adjusted under 35 U.S.C. 154(b) by 140 days.

(21) Appl. No.: 16/394,428

(22) Filed: Apr. 25, 2019

(65) Prior Publication Data

US 2019/0329654 A1 Oct. 31, 2019

(30) Foreign Application Priority Data

Apr. 30, 2018 (DE) .......................... 102018110357.3

(51) Int. Cl.
*B60L 1/00* (2006.01)
*B60H 1/00* (2006.01)
*F04B 39/06* (2006.01)

(52) U.S. Cl.
CPC .......... *B60L 1/003* (2013.01); *B60H 1/00428* (2013.01); *F04B 39/06* (2013.01); *B60L 2240/36* (2013.01)

(58) Field of Classification Search
CPC ... B60L 1/003; B60H 1/00428; B60H 1/3223; F04B 39/06; F25D 17/045; F25D 17/067
See application file for complete search history.

(56) References Cited

U.S. PATENT DOCUMENTS

| | | | |
|---|---|---|---|
| 10,156,239 B2 * | 12/2018 | Nakagami | F04D 25/068 |
| 2010/0246083 A1 * | 9/2010 | Shibuya | B60H 1/3225 |
| | | | 361/93.8 |
| 2017/0127566 A1 * | 5/2017 | Imura | F25B 31/006 |

FOREIGN PATENT DOCUMENTS

| | | |
|---|---|---|
| DE | 102015217917 A1 | 3/2016 |
| DE | 102015103053 A1 | 9/2016 |
| DE | 102015219149 A1 | 3/2017 |
| DE | 202016008176 U1 | 4/2017 |
| DE | 102016215166 A1 | 6/2017 |
| JP | 2009074517 A | 4/2009 |
| JP | 2010275951 A | 12/2010 |
| JP | 2011163231 A | 8/2011 |
| KR | 20160090673 A | 8/2016 |
| WO | 2018051718 A1 | 3/2018 |
| WO | WO-2018051718 A1 * | 3/2018 ............ H02M 7/48 |

* cited by examiner

*Primary Examiner* — Ana M Vazquez
(74) *Attorney, Agent, or Firm* — Norton Rose Fulbright US LLP; James R. Crawford

(57) ABSTRACT

A motor housing for a compressor, having a cylindrical, internally pressurized part for receiving the electric motor, which, at the compressor side, is securable on a central housing member of the compressor and, at the head side, is closed by a bottom whose outer side serves as a contact area for an inverter for driving the motor, wherein on the inner side of the bottom a flow path for cold suction gas and on the outer side of the bottom cooling areas for the absorption of heat loss generated by the inverter are developed. An assembly having a motor housing, an inverter and an electric motor are also provided.

7 Claims, 9 Drawing Sheets

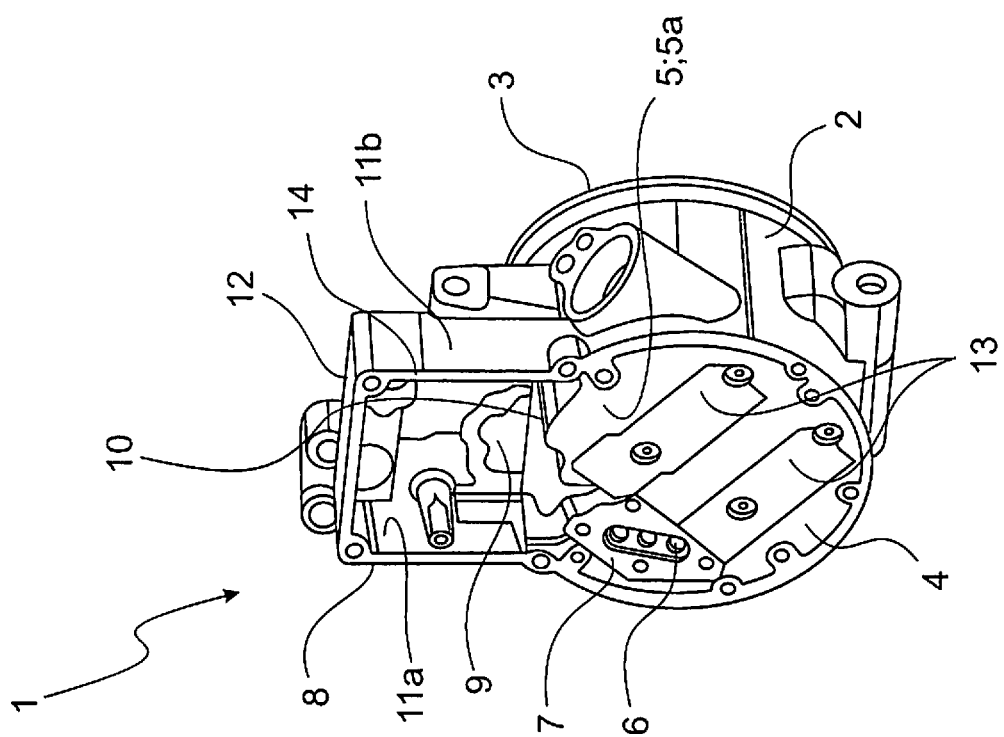

MOTOR HOUSING FOR AN ELECTRIC COMPRESSOR OF AN AIR CONDITIONING SYSTEM

This application claims priority from German Patent Application No. 102018110357.3 filed on Apr. 30, 2018, which is hereby incorporated herein by reference in its entirety.

FIELD OF THE INVENTION

The invention relates to a motor housing for a compressor of a climate control system. The invention relates furthermore to an assembly comprising the motor housing, an inverter and an electric motor.

BACKGROUND AND SUMMARY OF THE INVENTION

An electric refrigerant compressor for the operation of a climate control system in a motor vehicle is comprised of a group of several subassemblies.

This group comprises a compressor stage for the working medium (refrigerant), an electric motor driving the compressor stage and an inverter for driving the electric motor from a direct voltage source (motor vehicle battery).

The climate control system operated by the electric refrigerant compressor generates a refrigeration capacity. In the integration of the subassemblies into a common housing it is advantageous to exploit the availability of a portion of this generated cooling capacity for cooling the inverter and the motor. The compressor comprises furthermore a pressure-resistant housing that receives the compressor stage and the electric motor (motor housing) as well as a housing volume for the inverter.

In the following three types or modes of configuration of the motor housing according to prior art will be described.

A first, commonly used configuration mode for motor housings of electric vehicle climate control compressors is comprised of implementing the front or head end of the cast aluminum housing as a machined-flat surface in order to be able to flange onto it a modular inverter. The motor housing is a container that itself is closed toward the inverter, thus at the head end, and absorbs the internal pressure stress through the working medium. This head end of the motor housing is internally swept-over by relatively cool suction gas. Through the contact of the inverter module toward the head end of the motor housing the heat loss of the inverter is transferred using an intermediate layer of thermally conductive material and is lastly absorbed by the suction gas.

The thermally conductive material is intended to improve the heat transfer between the worked surface of the inverter housing and the power semiconductors of the inverter. In contrast to the two configuration modes to be described later, however, in this way an additional heat transfer from the inverter housing across the thermally conductive material into the motor housing is created, whereby the heat removal from the inverter is impaired. The inverter module is sealed with the aid of a sealing, for example of a soft gasketing or beaded gasket, from the motor housing in order to prevent foreign media from penetrating into it.

The second, often applied configuration mode of motor housings comprises integrating the base support and the lateral enclosure of the inverter into the head end of the motor housing. The base support of the inverter as well as the sealing against the motor housing and the intermediate layer of thermally conductive material can in this way be omitted. Compared to the previously described mode of configuration, deheating the inverter through the suction gas is improved.

A third frequently applied configuration mode is comprised of integrating the head-end bottom of the motor housing into the base support of the inverter. The inverter can, consequently, still be implemented as a module. The motor housing itself is consequently open at the head side. In this way the intermediate layer of thermally conductive material can be omitted, whereby the best possible heat removal from the inverter into the suction gas can be achieved.

Motor housings with front-end flanged inverter module according to the above described first configuration mode entail the disadvantage of high complexity with respect to the number of component parts and assembly. The application of the thermally conductive intermediate layer between inverter and motor housing is required. Deheating the inverter consequently is not optimal.

While motor housings according to the second configuration mode enable omitting individual parts and ensure optimal deheating of the inverter, they do, however, entail disadvantages with regard to castability. The length of the housing is relatively large and one structurally highly-stressed region is developed on which the internal pressure acts and one region which only encloses the inverter. Pursuant to the stress, there is a relatively thick-walled pressurized housing region and a thin-walled region for receiving the inverter. This, in connection with relatively long flow paths and a relatively complicated geometry, is disadvantageous for the casting process. The housing region receiving the inverter requires a multiplicity of filigree mechanical workings and working planes for the securement and positioning of the inverter components which in this configuration mode, as a rule, must be mounted directly into the motor housing. The installation of the inverter must take place on the compressor which at this point is completely pre-assembled. This is required since the hermetically sealed part of the compressor must already be tested for its impermeability before the inverter can be added. If the compressor were to be tested for its impermeability only after the inverter assembly, the inverter in the event of a motor housing permeability would be lost, at least if the inverter, as is customary for this configuration mode, is a nonmodular inverter. It can then no longer be disassembled without undergoing destruction. It is of great disadvantage for the inverter installation if a nearly completed compressor must be manipulated. In such cases it is difficult to maintain the cleanliness and electrostatic requirements of the electronics that are necessary for the inverter installation.

A motor housing according to the above described third configuration mode has the disadvantage that it only becomes an impermeable pressure container through the installation of the inverter. The sealing between inverter and motor housing is accordingly elaborate. The threaded connection of inverter and motor housing must be sufficiently robust in order to be able to absorb the internal pressure stress. Such a strong and stable threaded connection is generally difficult to place in the available installation space.

The invention is intended to provide a motor housing which offers the least possible parts complexity in the assembly. To avoid the disadvantages of a housing according to the three configuration modes described above, this means there should be no sealing required between inverter and motor housing. As much as possible, the heat loss of the inverter is to be transferred directly to the suction gas. These improvements are to be attained without impairing the castability of the motor housing too much. Expenditures in working should be kept as low as possible. The motor housing, moreover, is to offer the feasibility of receiving an arrangement of intermediate circuit capacitors and a large standing (upright) EMC filter coil, a so-called common mode choke. The necessary connector plugs of the compressor should be simple to install on the motor housing and as well as also to contact on the circuit board of the inverter. It is furthermore desirable that the motor housing can house an electronic module of an inverter for the electric compressor, whereby a considerable improvement of the overall climate control system compressor is achieved.

The contact areas in such a module for securing the inner support structure part on the compressor housing are at least to some extent formed by the power semiconductors, wherein the contact areas in the nonsecured state project from the base plane. However, the contact areas, due to the resilient implementation of the inner support structure part and/or of its connection with the outer support structure part, are displaceable in the direction toward the normal with respect to the base plane such that a spring effect is attained and the requisite contact pressure can be provided directly between the power semiconductors and the compressor housing.

The problem addressed by the invention is resolved through a motor housing with the characteristics according to claim 1. A further aspect of the invention relates to an assembly comprising the motor housing according to the invention, an inverter and an electric motor. Advantageous further developments are each specified in the dependent claims.

A motor housing which meets said requirements is the motor housing proposed here for a compressor, comprising a cylindrical internally pressure-loaded part for receiving the electric motor which at the compressor side can be secured on a central housing member of the compressor and at the head side is closed by a bottom. The outer side of the bottom serves as the bearing area for an inverter for driving the motor. On the inner side of the bottom a flow path for cold suction gas is developed. The cool suction gas routed past on the inner side of the bottom can consequently entrain the heat loss generated by the inverter. As a consequence, cooling areas are developed on the outer side of the bottom for the absorption of the heat loss generated by the inverter. According to an advantageous embodiment of the invention, the bottom of the cylindrical part comprises on the outer side plateau-like regions as cooling areas which serve for the thermal coupling of power semiconductors of the inverter.

The cylindrical part is secured at the compressor side on the central housing member preferably via threaded connections. The bottom advantageously comprises one or more openings and a region with a connection geometry for receiving an electric feedthrough unit or of discrete electric feedthroughs such as are disclosed, for example in DE 10 2015 103 053 A1.

The semi-integral motor housing according to an advantageous implementation comprises toward the outside at the head end a box-like forming which represents a partial enclosure of the inverter electronics. Especially preferred as a box-like protuberance, for a partial enclosure of the inverter electronics, is a box-like receiving volume with a bottom and side walls surrounding this bottom, wherein one side wall is formed by a segment of the outer wall of the cylindrical part at its periphery. The further side walls are two side walls opposite to one another extending from the periphery of the cylindrical part, as well as a side wall connecting these side walls, which is disposed opposite to the side wall formed by the segment of the cylindrical part. In such a box-like protuberance one or several intermediate circuit capacitors can be housed standing upright. A large EMC filter coil (common mode choke) standing upright on the circuit board of the inverter can likewise be accommodated in this protuberance.

The bottom of the box-like receiving volume holds openings and connection and sealing regions for mounting the electric connector plugs. The box-form shaping preferably does not project at the inverter side beyond the bottom of the cylindrical part. At the inverter side, as already stated, the bottom has plateau-like regions which serve for thermal coupling of the power semiconductors of the inverter. The plateaus preferably form a plane with the inverter-side rim of the box-form protuberance and a sealing edge about the bottom. At the inverter side there is thus only one mechanical working plane. Onto this plane preferably an electronic module of an inverter for an electric compressor can be mounted. Such an electronic module can comprise a circuit board, one or several power semiconductors, busbars, at least one intermediate circuit capacitor, a filter coil for observing the electromagnetic compatibility (EMC filter coil) as well as a support structure. The support structure preferably comprises an outer support structure part which supports the circuit board and the securement devices necessary for installing the electronic module, utilizing securement elements, fixedly on a compressor housing along contact areas of the support structure that lie in a base plane. The support structure preferably comprises an inner support structure part, framed by the outer support structure part, which is implemented so as to be resilient and/or is connected resiliently with the outer support structure part, supports the one or the several power semiconductors and comprises securement means which, independently of the securement of the outer support structure part, permit the securement of the inner support structure part and the circuit board on the compressor housing utilizing securement elements. The mounted electronic module of the inverter projects at the head end beyond the motor housing according to the invention and is covered by means of a bowl-like inverter cap which is sealed against the motor housing using a simple flat gasket.

The semi-integral motor housing according to the invention reduces the complexity for example compared to the first configuration mode. The sealing between inverter module and motor housing as well as the thermally conductive layer are omitted whereby the complexity decreases. The partial enclosure of the inverter and the inverter interface enable the application of the inverter as an electronic module with simplified structure as described above. Specifically in connection with an electronic module of the inverter implemented thusly, further advantages are obtained. The power semiconductors of the inverter can be thermally tied directly to the inner cooled bottom of the motor housing. Therewith an optimal deheating of the inverter is achieved. The premounted core compressor can be tested for impermeability and function before emplacing the inverter. This is not possible for example in the case of a compressor according to the above described third configuration mode. The electronic module of the inverter can be structured separately from the fabrication of the compressor. This is not possible in a compressor according the above described second configuration mode.

The semi-integral motor housing enables the inverter covering by a bowl-like cap with large depth. Such cap is more rigid than a conventional flat inverter lid. The increased cap rigidity yields improved sealing with respect to the motor housing as well as an improved NVH (Noise Vibration Harshness) response, which means a reduction of the audible and perceptible vibrations on the climate control system.

Specifically in connection with the above described electronic module of the inverter through the semi-integral motor housing, cost savings are achieved due to the parts complexity that is no longer necessary. The core compressor as well as also the electronic module of the inverter can be produced separately and be pretested before assembling them, which reduces the rejection rate and improves quality.

Further details, characteristics and advantages of embodiments of the invention will become evident based on the following description of embodiment examples with reference to the associated drawing.

BRIEF DESCRIPTION OF THE FIGURES

FIG. 4: cylindrical part of a motor housing in a perspective view onto its head end.

DETAILED DESCRIPTION

Figure 1:
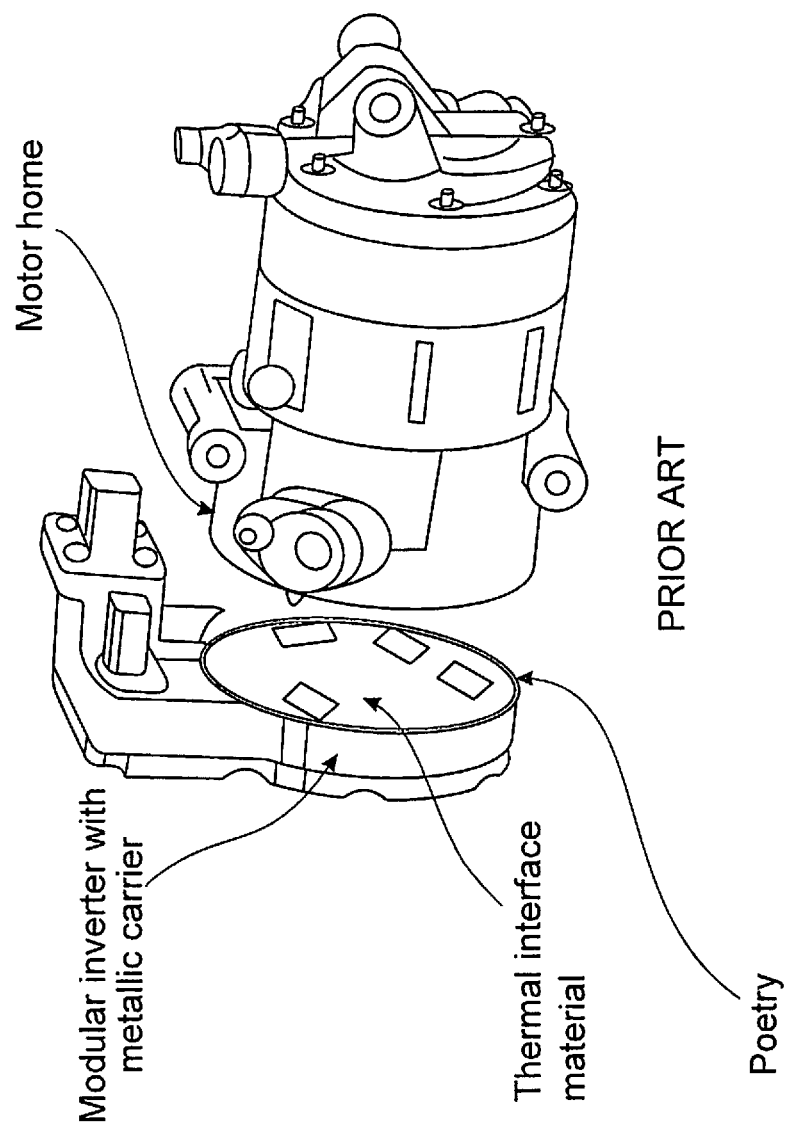
FIG. 1: a first configuration mode of a motor housing according to prior art.

FIG. 1 shows a perspective view of a motor housing and an associated inverter for an electric vehicle climate control system compressor corresponding to a first, conventional configuration mode for the connection of inverter and motor housing according to prior art. Herein is applied a modular inverter on the base of a metal inverter support, an intermediate layer of thermally conductive material as well as a motor housing. This first configuration mode comprises, in particular, that the front end of the cast aluminum housing of the motor is implemented as a machined-flat surface in order to be able to flange the modular inverter thereon. The motor housing is a container that itself is closed toward the inverter, thus at the head end and is therefore a non-integral motor housing. It absorbs the internal pressure stress through the working medium. This head end of the motor housing is internally swept-over by relatively cool suction gas. Through the contact of the inverter module toward the head end of the motor housing, the heat loss of the inverter is transferred using an intermediate layer of thermally conductive material and is lastly absorbed by the suction gas.

The thermally conductive material is intended to improve the heat transfer between the worked surface of the inverter housing and the power semiconductors of the inverter. However, in contrast to the two configuration modes to be described later, in this way an additional heat transfer from the inverter housing across the thermally conductive material into the motor housing is generated, whereby the heat removal from the inverter is impaired. The inverter module is sealed with the aid of a sealing, for example of a soft gasketing or beaded gasket, from the motor housing in order to prevent foreign media from penetrating into it.

Figure 2:
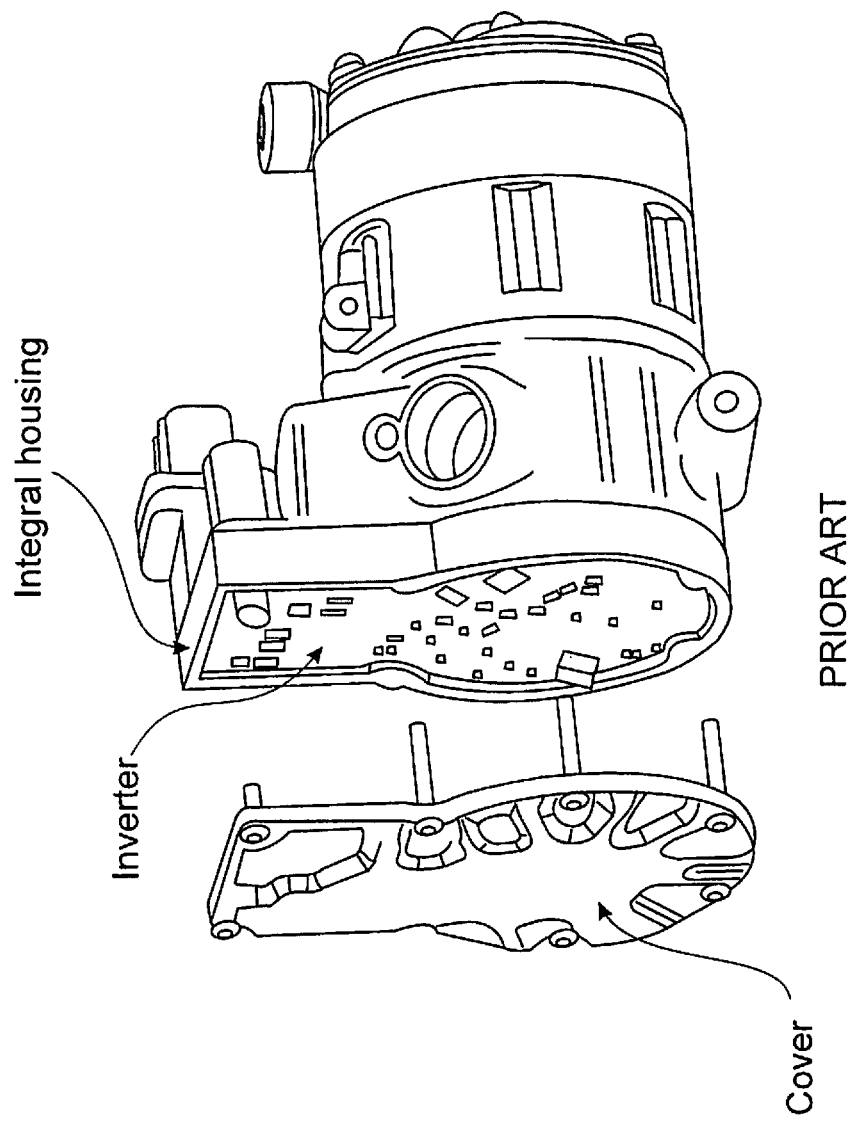
FIG. 2: a second configuration mode of the motor housing according to prior art.

FIG. 2 shows a second configuration mode of the motor housing according to prior art. In the depicted example of the second configuration mode the inverter, implemented in the form of an electronic module, is installed directly in the motor housing and closed by a flat lid. Such a motor housing can also be termed integral housing. That means the base support and the lateral enclosure of the inverter is integrated into the head end of the motor housing. In this way the base support of the inverter as well as the sealing against the motor housing and the intermediate layer of a thermally conductive material are not needed and can be saved. The deheating of the inverter by the suction gas is improved compared to the first described configuration mode.

Figure 3A:
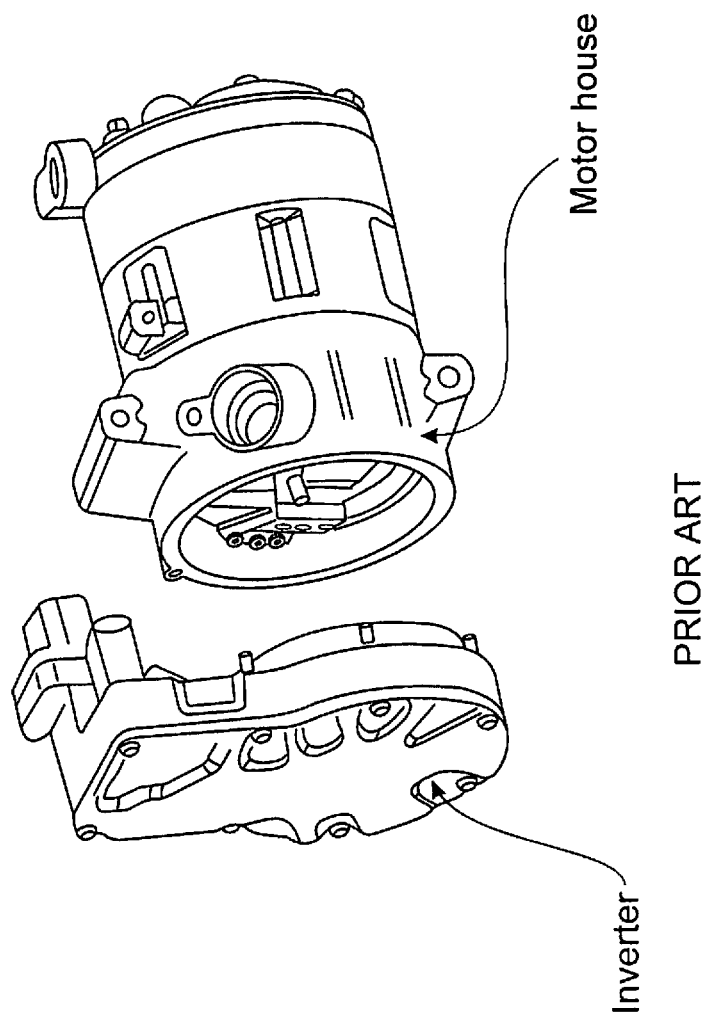
FIG. 3A: a third configuration mode of the motor housing as a perspective view with view from the outside onto the head end.
Figure 3B:
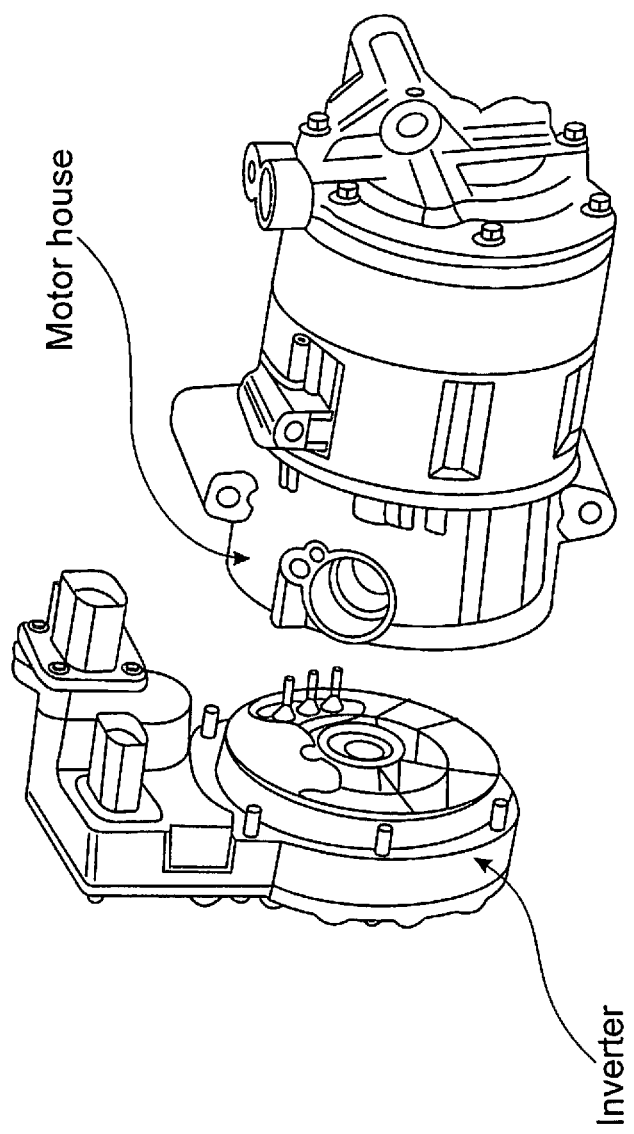
FIG. 3B: the third configuration mode of the motor housing as a perspective view with view from the inside onto the head end.

FIGS. 3A and 3B show a third configuration mode of the motor housing according to prior art in a perspective view onto the head end from the outside (FIG. 3A) or from the inside (FIG. 3B). The head-end side bottom of the motor housing is herein integrated into the base support of the inverter. The inverter is therewith pressure bearing. The inverter can thus still be implemented as an electronic module. The motor housing itself is consequently open at the head end. In this way the intermediate layer of thermally conductive material can be omitted whereby the best possible heat removal from the inverter into the suction gas can be achieved.

FIG. 4 shows an embodiment example of a motor housing 1 according to the invention in a perspective view onto a cylindrical part 2 from the outside. A motor housing 1 that meets the requirements according to the invention will subsequently be termed semi-integral. The semi-integral motor housing 1 comprises the cylindrical part 2 which is internally pressurized and receives the electric motor comprising, as a rule, a rotor and a stator. An end of the cylindrical part 2 faces the compressor and thus forms the compressor side 3, wherein the cylindrical part 2 is connected by threaded connection at the compressor side to a central housing member not shown in FIG. 4. The cylindrical part 2 is closed with a bottom 5 at its head end 4, wherein FIG. 4 shows the outer side 5a of bottom 5. Along the inner side, not shown in FIG. 4, of bottom 5 the suction gas is conducted which entrains the heat loss generated by the inverter. The bottom 5 comprises one or several openings 6 and a connection region 7 with a suitable connection geometry for receiving an electric feedthrough unit or discrete electric feedthroughs such as are disclosed in DE 10 2015 103 053 A1 for example.

Toward the outside the semi-integral motor housing 1 comprises at the head side a box-like receiving volume 8 with a bottom 9 and side walls 10, 11a, 11b, 12 encompassing this bottom, wherein one side wall 10 is formed by a segment of the outer wall of the cylindrical part 2 at its circumference. The remaining side walls are two parallel side walls 11a, 11b extending from the circumference of the cylindrical part 2, as well as a side wall 12 connecting these side walls 11*a*, 11*b*, which side wall 12 is opposite to the side wall 10 formed by a segment of the cylindrical part 2.

The box-like receiving volume 8 enables the partial enclosure of the inverter electronics. Stated more precisely, in this box-like outward protuberance one or several intermediate circuit capacitors can be accommodated standing upright. A large EMC filter coil, also referred to as common mode choke, on the inverter board can also be emplaced standing upright in this box-like receiving volume 8. The bottom 9 of the box-like receiving volume 8 holds openings and connection and sealing areas for mounting electrical connector plugs. The box-like receiving volume 8 is shaped such that at the inverter side, meaning in the direction of the inverter, it does not project beyond the bottom 5 of the cylindrical part 2 of motor housing 1. The bottom 5 of the cylindrical part 2 comprises at the inverter side plateau-like regions 13 that serve for the thermal coupling of the power semiconductors of the inverter. The plateau-like regions 13 form a plane with the inverter-side rim 14 of the box-like receiving volume 8 and a sealing edge encircling the bottom 5 of the cylindrical part 2. There is consequently only one mechanical working plane.

Figure 5:
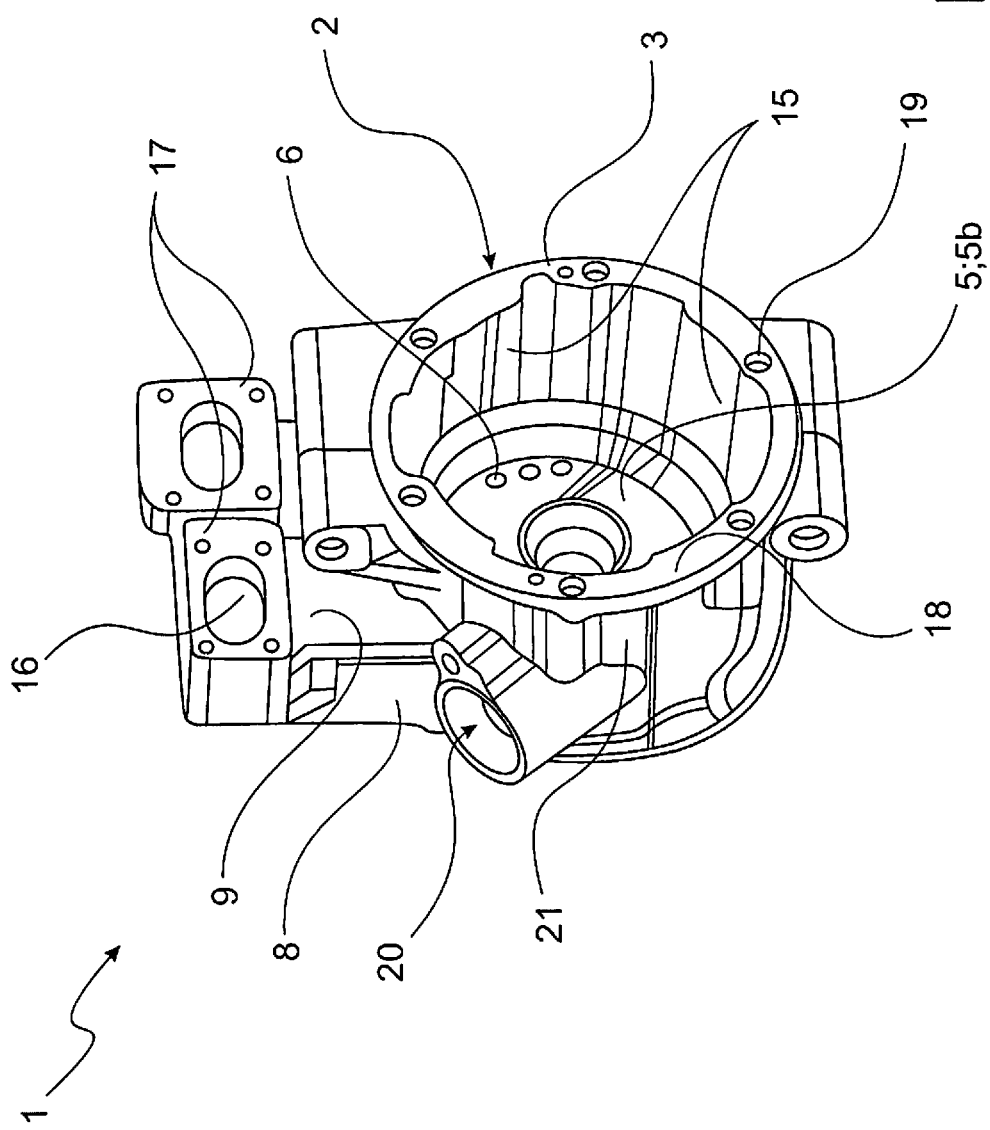
FIG. 5: cylindrical part of the motor housing in a perspective view onto the region for motor receptance.

FIG. 5 shows the cylindrical part 2 of the motor housing 1 from the inside in a perspective view onto the compressor side 3 and the hollow cylindrical region 15 for receiving the motor. This cylindrical part 2 comprises on its inner side a hollow cylindrical region 15 with a connection geometry for securing the motor. FIG. 5 shows the backside 5*b* of bottom 5 with the openings 6 for receiving an electric feedthrough unit as well as the backside of bottom 9 of the box-like receiving volume 8 with the openings 16, described above, and connection and sealing areas 17 with the corresponding connection geometry for mounting electric connector plugs. The compressor-side front face of the cylindrical part 2 is formed by a flange 18. The flange 18 comprises openings 19 for the securement by threaded connection on the central housing member. A suction port 20 projects from the outer wall 21 of the cylindrical part 2. Via this suction port 20 for the suction gas the cool suction gas can be routed underneath bottom 5 of the cylindrical part 2 on the inner side of bottom 5.

Figure 6:
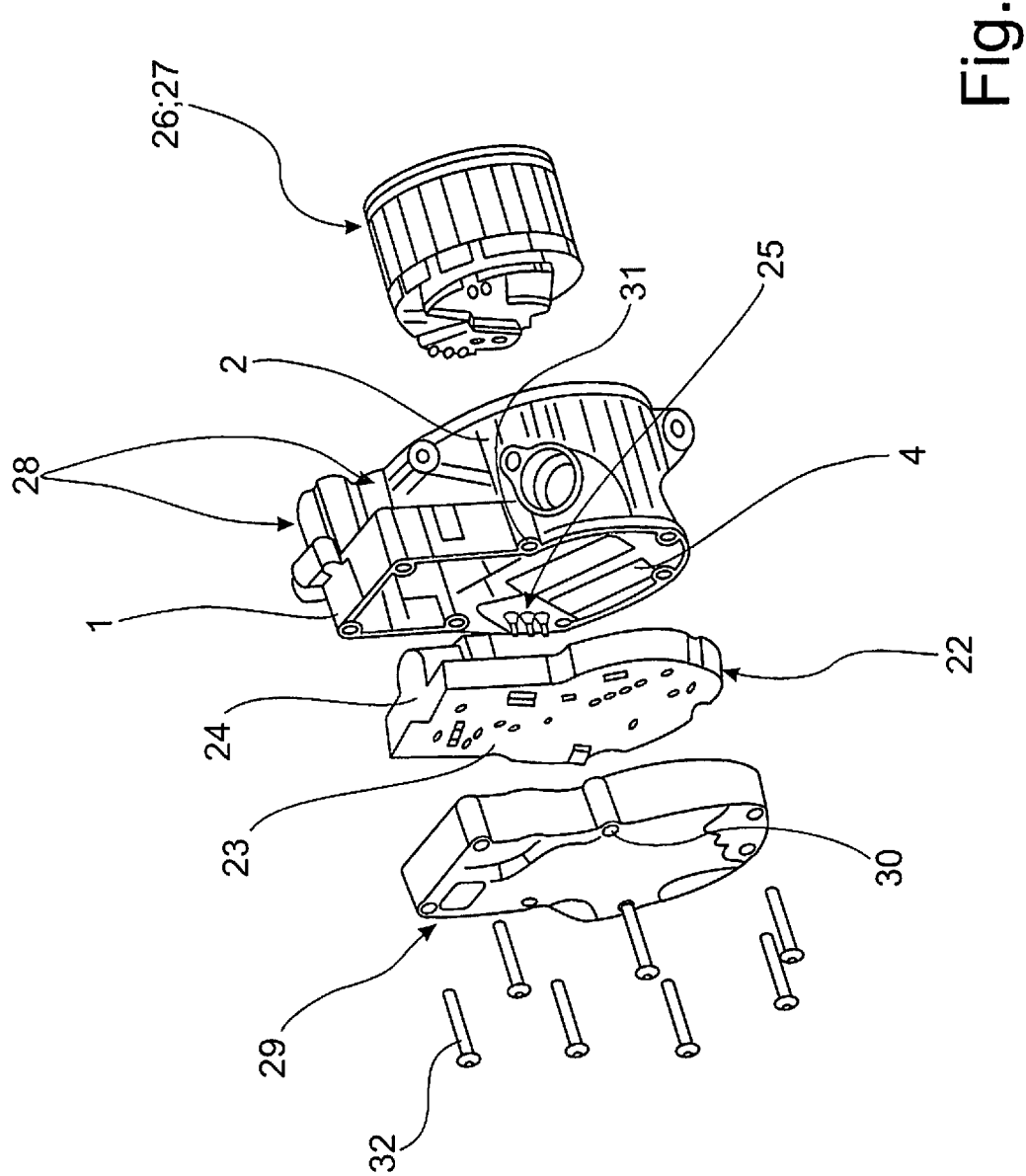
FIG. 6: an exploded representation of an assembly of the motor housing with an inverter and an electric motor in a perspective view onto the head end of the cylindrical part of the motor housing from the outside.

FIG. 6 shows an exploded representation in a perspective view, onto the head side of the cylindrical part 2 of motor housing 1 from the outside, of an assembly of motor housing 1 with an inverter 22, formed as an electronic module of a circuit board 23, a support structure 24 and power components, an electric feedthrough unit 25, the electric motor 26, comprised of a cylindrical stator 27 and a rotor and is received into the cylindrical part 2 of motor housing 1, as well as with the electrical connector plugs 28.

The inverter 22 installed on the head side is covered by a bowl-like inverter cap 29 with large depth. The inverter cap 29 comprises openings 30 which are congruent with openings 31 on the head side 4 of the cylindrical part 2 of the motor housing 1, such that corresponding bolts 32 can be introduced into the openings 30, 31, wherein they are guided past the outer edge of support structure 24 of the inverter 22.

Figure 7:
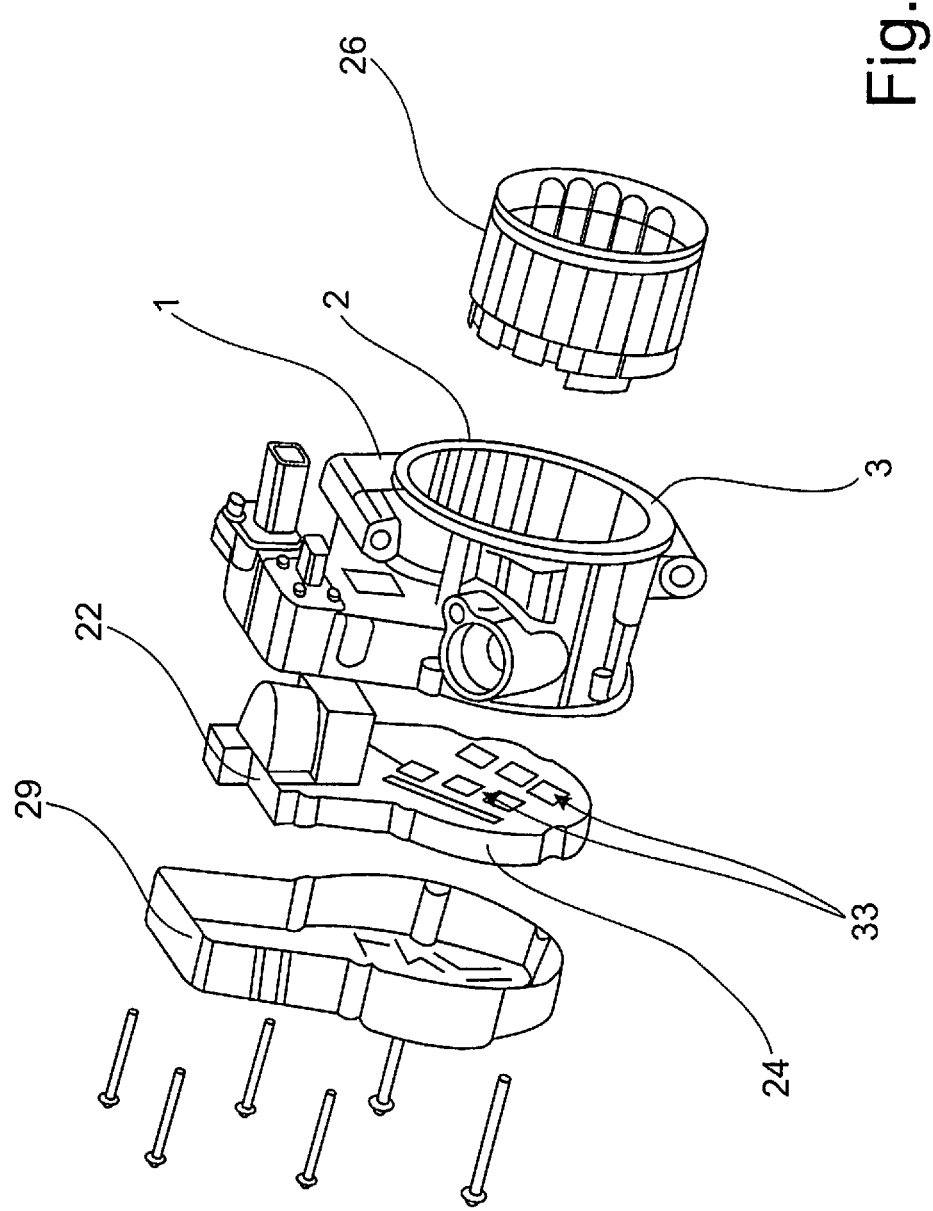
FIG. 7: an exploded representation of an assembly of the motor housing with an inverter and an electric motor in a perspective view onto the compressor side of the cylindrical part and the interior of the motor housing.

FIG. 7 shows an exploded representation of the same assembly of motor housing 1 with the inverter 22 and the electric motor 26 in a perspective view onto the compressor side 3 of the cylindrical part 2 of the motor housing 1 from the inside. Herein the underside of the inverter 22, developed as an electronic module, can also be seen in which power semiconductors 33 form at least partially the contact areas for the securement of an internal support structure part of the support structure 24 on the compressor housing, wherein the contact areas in the non-secured state project from a base plane. The perspective selected in FIG. 7 also permits a view onto the inner side of the inverter cap 29.

Figure 8:
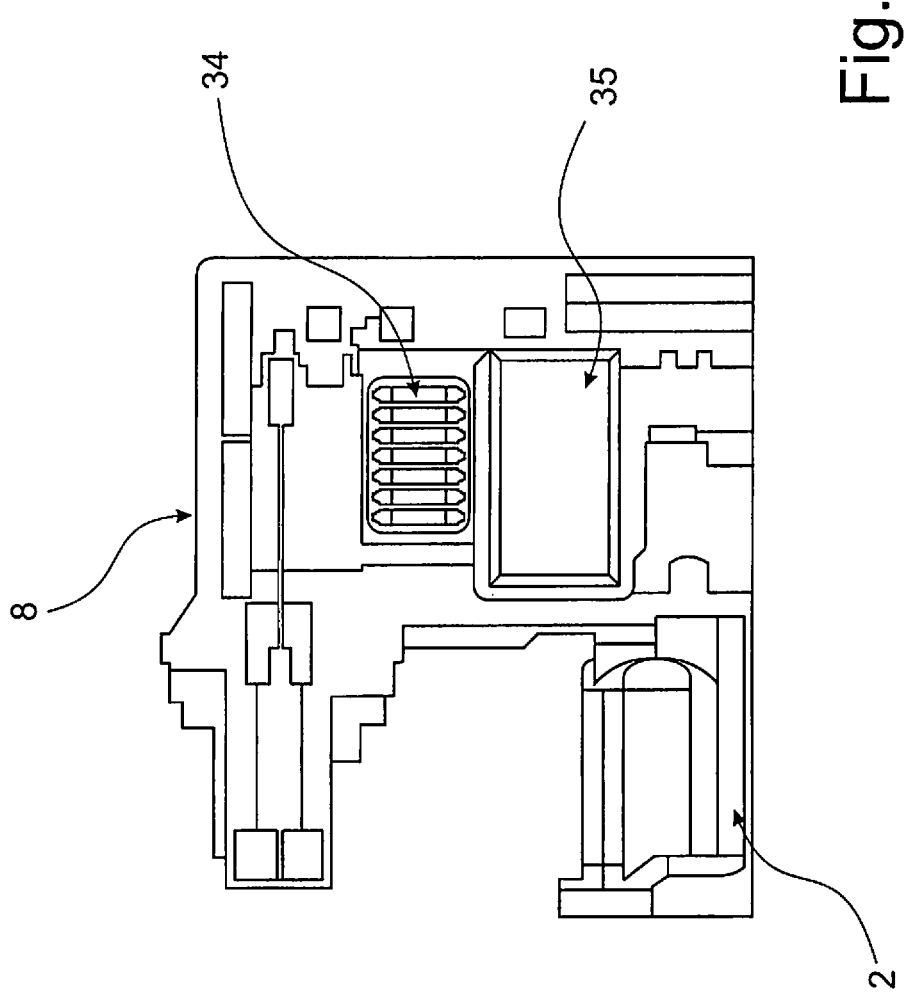
FIG. 8: a detailed view onto a box-like receiving volume of the motor housing and the disposition of an intermediate circuit capacitor and a filter coil (common mode choke) for observing electromagnetic compatibility (EMC) in the motor housing.

FIG. 8 shows a detailed view onto the box-like receiving volume 8 of motor housing 1, in which an EMC filter coil 34, which means a filter coil for observing the electromagnetic compatibility (EMC), and an intermediate circuit capacitor 35 are disposed.

LIST OF REFERENCE NUMBERS

1 Motor housing
2 Cylindrical part of motor housing
3 Compressor side of cylindrical part
4 Head side of cylindrical part
5 Bottom of cylindrical part at head side
5*a* Outer side of bottom
5*b* Inner side of bottom
6 Openings in bottom
7 Connection region for electric feedthrough
8 Box-like receiving volume for partial enclosure of inverter electronics
9 Bottom of box-like receiving volume
10 Side wall of box-like receiving volume
11*a* Side wall of box-like receiving volume
11*b* Side wall of box-like receiving volume
12 Side wall of box-like receiving volume
13 Plateau-like regions
14 Inverter-side rim of box-like receiving volume
15 Hollow cylindrical region for receiving electric motor
16 Openings for mounting connector plugs
17 Connection and sealing areas with a connection geometry for mounting electric connector plugs
18 Flange
19 Openings in the flange for thread-connection on central housing member
20 Suction port
21 Outer wall
22 Inverter
23 Circuit board
24 Support structure
25 Electric feedthrough unit, electric feedthrough
26 Electric motor
27 Cylindrical stator
28 Connector plug
29 Inverter cap
30 Openings of inverter cap
31 Openings on head side of cylindrical part for securement of inverter cap
32 Bolts
33 Power semiconductor
34 EMC filter coil
35 Intermediate circuit capacitor

What is claimed is:
1. A motor housing for a compressor comprising:
a cylindrical, internally pressurized part for receiving an electric motor, which, at a compressor side, is securable on a central housing member of the compressor and, at a head side, is closed by a bottom whose outer side serves as a contact area for an inverter for driving the motor, wherein on an inner side of the bottom a flow path is developed for cold suction gas and on an outer side of bottom cooling areas for the absorption of heat loss generated by the inverter is developed,
wherein the motor housing comprises at the head side a box-like receiving volume with a bottom and side walls encompassing this bottom for a partial enclosure of inverter electronics that is integrally formed around the cylindrical part of the motor housing, wherein the bottom of the box-like receiving volume comprises openings and connection and sealing areas with a connection geometry for mounting electric connector plugs, wherein the bottom comprises on the outer side plateau-like regions as the cooling areas, which serve for the thermal coupling of a plurality of power semiconductors of the inverter, and wherein plateau-like regions form a plane with an inverter-side rim of the box-like receiving volume and a sealing edge encircling the bottom of the cylindrical part.

2. A motor housing as in claim 1, wherein one side wall is formed by a segment of the outer wall of the cylindrical part on its circumference and the remaining side walls are two opposite side walls extending from the circumference of the cylindrical part as well as a side wall, connecting these side walls, disposed opposite the side wall formed by the segment of the cylindrical part.

3. An assembly, comprising a motor housing as in claim 2, an inverter and an electric motor, wherein the electric motor is received into the cylindrical part of the motor housing and the inverter is disposed at the head side and covered by a bowl-like inverter cap, wherein in the box-like receiving volume of the motor housing an EMC filter coil and one or several intermediate circuit capacitors of the inverter are disposed.

4. A motor housing as in claim 1, wherein the bottom comprises one or several openings and a region with a connection geometry for receiving an electric feedthrough unit or discrete electric feedthroughs.

5. An assembly, comprising a motor housing as in claim 1, an inverter and an electric motor, wherein the electric motor is received into the cylindrical part of the motor housing and the inverter is disposed at the head side and is covered by a bowl-like inverter cap.

6. An assembly as in claim 5, wherein the inverter is implemented as an electronic module of a circuit board, a support structure and power components.

7. A motor housing for a compressor comprising:

a cylindrical, internally pressurized part for receiving an electric motor, which, at a compressor side, is securable on a central housing member of the compressor and, at a head side, is closed by a bottom whose outer side serves as a contact area for an inverter for driving the motor, wherein on an inner side of the bottom a flow path is developed for cold suction gas and on an outer side of bottom cooling areas for the absorption of heat loss generated by the inverter is developed, wherein the bottom of the cylindrical part comprises on the outer side plateau-like regions as the cooling areas, which serve for the thermal coupling of a plurality of power semiconductors of the inverter, wherein the cylindrical part comprises on its inner side a hollow cylindrical region with a connection geometry for securing the motor, wherein the motor housing comprises at the head side a box-like receiving volume with a bottom and side walls encompassing this bottom for a partial enclosure of inverter electronics, wherein plateau-like regions form a plane with an inverter-side rim of the box-like receiving volume and a sealing edge encircling the bottom of the cylindrical part.

* * * * *